Oct. 31, 1967     CARL-GUNNAR D. ENGSTRÖM     3,349,790

VALVE DEVICE IN GAS SYSTEMS

Filed April 20, 1964

*INVENTOR*
CARL-GUNNAR DANIEL ENGSTRÖM

United States Patent Office 3,349,790
Patented Oct. 31, 1967

3,349,790
VALVE DEVICE IN GAS SYSTEMS
Carl-Gunnar Daniel Engström, Aluddsvagen 3,
Stockholm, Sweden
Filed Apr. 20, 1964, Ser. No. 361,074
Claims priority, application Sweden, Apr. 30, 1963,
4,758/63; June 20, 1963, 6,905/63
2 Claims. (Cl. 137—247.17)

The invention relates to a valve device acting as a safety valve in gas systems, particularly in gas systems of breathing apparatus, where there is an overpressure or where an overpressure may arise, such as in respirators and the like.

When dealing with gas systems, which are connected to a patient's organ of breathing, such as is the case in for instance respirators, the lungs of the patient must not be subjected to impermissible high pressures in case of malfunction of the used apparatus, for instance by electric failure. The maximum pressure being allowed to arise in the circuit is often in hitherto used respirator types controlled by so-called liquid traps. The advantage of this type of safety valve is that it is constructionally simple, reliable and absolutely leak-proof, which latter characteristic is necessary for a satisfactory function of the apparatus. In these types of breathing apparatus liquid traps are used, which are released at overpressures of as a rule 30–35 cm. water column. However, it is desired to raise the overpressure in the gas circuit to about twice this value, that is 60–70 cm. water column, for obtaining a satisfactory ventilation also in patients, the lungs of which are in a bad condition. For obtaining this greater overpressure in the circuit a liquid trap with a height of at least 60–70 cm. would be necessary. However, this great height makes the liquid trap difficult to handle and space consuming.

The object of the invention therefore is to provide a safety valve, which is released at an overpressure, which is higher than is regarded practical for single water traps, for instance by an overpressure of about 60–70 cm. water column or higher, and which at the same time is easy to handle, takes up a small space and is absolutely leak-proof. The object is obtained according to the invention by a valve device comprising at least at mechanical safety valve and at least a liquid trap, the liquid trap being placed after said mechanical valve in series therewith and being open to the atmosphere.

Figure 1:
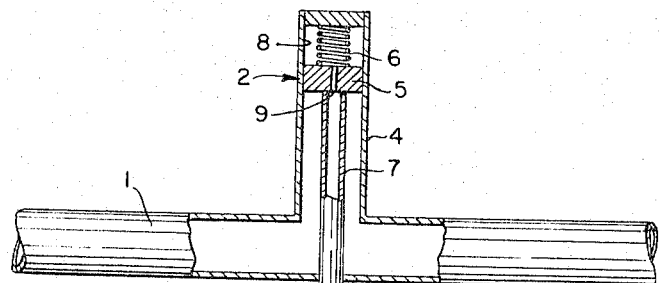
Figure 1:
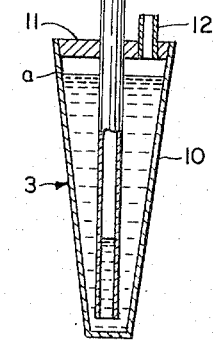
Figure 2:
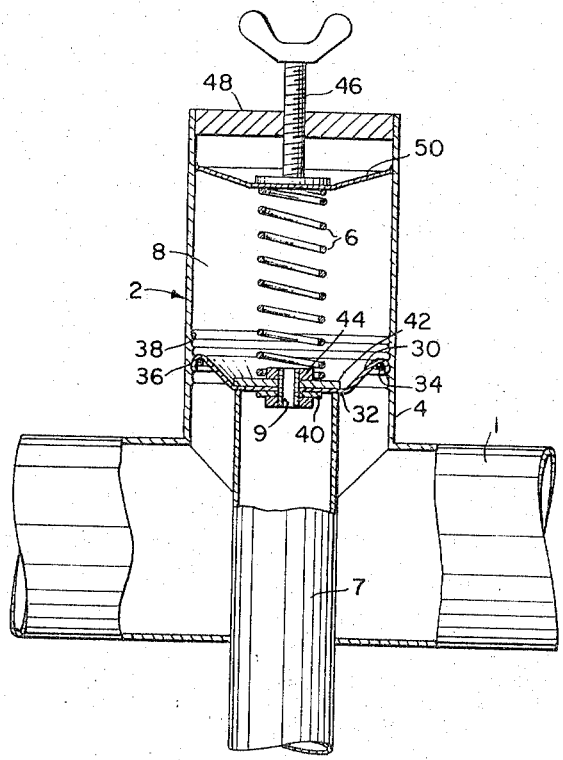
Figure 3:
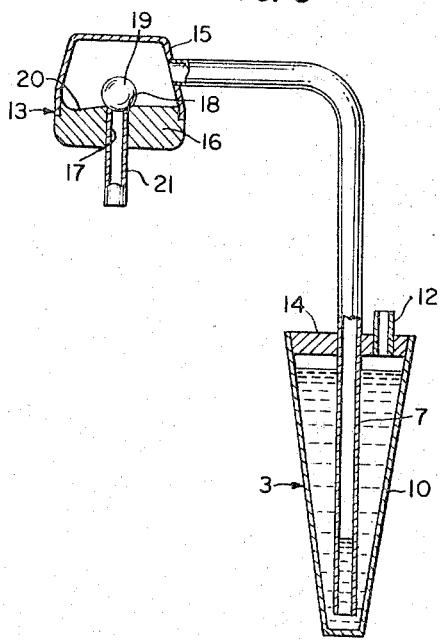

In the following the invention is further illustrated by examples with reference to the accompanying drawing, where FIG. 1 shows a vertical section through a valve device consisting of a spring valve and a liquid trap, FIG. 2 shows a vertical section through a valve device consisting of a membrane valve and a liquid trap and FIG. 3 shows a vertical section through valve device consisting of a liquid trap and a ball valve.

The valve device according to FIG. 1 consists of a spring valve 2 connected to a gas system 1 and a liquid trap 3 coupled in series therewith. The spring valve 2 is mounted in a conduit 4 connected to the gas system and comprises an axially displaceable element 5 sealing against the conduit 4 and by a compression spring 6 sealingly engaging the upper end of a vertical tube 7, the element 5 forming a closed space 8, which by an opening 9 in the element 5 is connected to the tube 7.

The tube 7 opens downwardly into a container 10 filled with liquid to the level $a$, the container having the form of a frustrated cone having its apex extending downwardly, the liquid surface being connected to the surroundings by a tube 12 led through the lid 11 of the container.

In operation the valve device functions in the following way assumed that the opening pressure of the spring valve is $P_1$ cm. W.C. and of the liquid trap $P_2$ cm. W.C.:

As long as the overpressure in the gas system does not exceed the value $P_1+P_2$ principally nothing happens with the valve, but as soon as the pressure exceeds this value the sealing element 5 is lifted by the gas in the gas system, whereafter the gas passes into the tube 7 and presses the liquid therefrom and continues up through the liquid in the container 10 and into the surroundings through the tube 12. The valve arrangement described thus allows a maximum pressure of the $P_1+P_2$ cm. W.C. in the gas system, below which pressure it is absolutely leak-proof.

The mechanical valve 2 is formed as a membrane valve and provided in a conduit 4 connected to a gas system 1. In the valve a membrane 30 is provided for sealing up to a predetermined pressure of the mouth 32 of the conduit 7 leading to the water trap, the membrane consisting of metal, rubber or the like. The membrane, which is suitably formed as a bowl, is arranged to permanently seal against the inner wall of the connecting conduit 4, so that a back pressure space 8 is formed, which is closed to the gas system 1. The sealing against the wall is obtained by a clamping ring 34, which is provided in a downwardly reversely bent edge 36 in a peripheral part of the membrane 30, which ring urges the edge 36 against the inner wall, a knurled or threaded region 38 suitably being arranged on the inner wall for obtaining axial fixation of the peripheral part of the membrane. On both sides of the membrane 30 circular plates 40, 42 may be arranged, which are joined by a bolt 44 provided with a central pasage 9. By a helical spring 6 the membrane 30 sealingly engages the upper end 32 of the tube 7 with a predetermined pressure, the space 8 being connected to the tube 7 by the passage 9 in the bolt 44.

For adjustment of the tension of the helical spring 6, that is the opening pressure of the membrane 30, the upper end of the spring is displaceable by a screw 46 which is screwed into a lid 48 at the upper part of the connecting conduit 4, a membrane 50 possibly being sealingly arranged against the walls of the conduit 4 between the spring 6 and the screw 46 for obtaining a satisfactory sealing.

The tube 7 opens downwardly into the liquid trap, which constitutes the latter valve unit, and the function of the valve assembly is for the rest similar to the function of the embodiment described above in connection to FIG. 1.

The embodiment described above can of course be modified in several ways. For instance the membrane 30 may be formed so as to by its own resilience sealingly engage the mouth 32 of the tube 7, the membrane suitably consisting of hard rubber or metal. By this arrangement the spring may be omitted. The adjustment of the opening pressure of the valve may alternatively be done by displacing the peripheral part of the membrane 30 axially in relation to the surrounding conduit 4.

In FIG. 3 is shown an embodiment, by which the liquid trap 3 is coupled in series with a ball valve 13. The ball valve 13 comprises a container 15 in the bottom 16 of which is an aperture 17, which is connected to the gas system the pressure of which is to be controlled by a tube 21. The interior of the container 15 is connected to the liquid trap 3 by the tube 7. In connection to the aperture 17 there is provided a valve seat 18 on the upper side of the bottom 16, against which lies a ball 19 sealing by its own weight. Beside the seat 18 there is a recess 20 in the bottom 16.

The functioning of this embodiment is mainly the same as of the embodiment shown in FIG. 1, but for that the pressure after an impermissible increase is released down to the pressure corresponding to the liquid column of the liquid trap in that the ball 19 of the ball valve 13 by the release of the valve is transferred to the recess 20, where it remains even if the pressure falls below the total opening pressure of the valve device.

While specific details of preferred embodiments have been set forth above it is obvious to those skilled in the art that many changes and modifications may be made without departing from the spirit of the invention. It is therefore to be understood that the described embodiments are only intended to be illustrative and not limiting the scope of the invention.

I claim:

1. A gas pressure safety and relief valve device comprising: a conduit having a first open end and a second closed end, said conduit being connected at said first end to a gas system; a safety valve unit in said conduit comprising a membrane sealingly engaging the wall of said conduit intermediate its ends, a tube extending coaxially into said conduit through said first end into engagement with said membrane at one end and into a liquid trap at its other end; a spring between the membrane and said closed end, an aperture in said membrane establishing communication between the tube and the chamber formed between the membrane and closed end of the conduit; said membrane being adapted to flex away from the adjacent end of said tube upon occurrence of gas pressure in said gas system greater than the combined force on said membrane of said spring and pressure in said chamber corresponding to the head of the liquid in said trap to relieve the gas pressure in said system.

2. A gas pressure safety and relief valve device comprising: a conduit having a first open end and a second closed end, said conduit being connected at said first end to a gas system; a safety valve unit in said conduit comprising a resilient valve sealingly engaging the wall of said conduit intermediate its ends, a tube extending coaxially into said conduit through said first end into engagement with said resilient valve at one end and into a liquid trap at its other end; a spring between the resilient valve and said closed end, an aperture in said resilient valve establishing communication between the tube and the chamber formed between the resilient valve and closed end of the conduit; said resilient valve being adapted to flex away from the adjacent end of said tube upon occurrence of gas pressure in said gas system greater than the combined force on said resilient valve of said spring and pressure in said chamber corresponding to the head of the liquid in said trap to relieve the gas pressure in said system.

References Cited

UNITED STATES PATENTS

| 1,024,163 | 4/1912 | Thomas | 132—247.17 X |
| 1,926,373 | 9/1933 | Denk | 137—247 |
| 2,392,214 | 1/1946 | Cruzan | 137—116 |

FOREIGN PATENTS

| 361,931 | 11/1906 | France. |

WILLIAM F. O'DEA, *Primary Examiner.*

D. H. LAMBERT, *Assistant Examiner.*